US011972669B2

(12) United States Patent
Rogan et al.

(10) Patent No.: US 11,972,669 B2
(45) Date of Patent: Apr. 30, 2024

(54) SYSTEM AND METHOD FOR VEHICLE SECURITY MONITORING

(71) Applicant: Ford Global Technologies, LLC, Dearborn, MI (US)

(72) Inventors: Douglas Rogan, Mountain View, CA (US); Shruthi Venkat, Mountain View, CA (US); Nikhil Nagraj Rao, Cupertino, CA (US); Sam Harris, Essex (GB); Tarik Safir, Derbyshire (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/982,966

(22) Filed: Nov. 8, 2022

(65) Prior Publication Data

US 2023/0054457 A1 Feb. 23, 2023

Related U.S. Application Data

(63) Continuation of application No. 17/394,910, filed on Aug. 5, 2021, now Pat. No. 11,532,221.

(51) Int. Cl.

| | |
|---|---|
| ***G08B 13/196*** | (2006.01) |
| ***G08B 7/06*** | (2006.01) |
| ***G08B 13/08*** | (2006.01) |
| ***G08B 13/16*** | (2006.01) |
| ***G08B 25/00*** | (2006.01) |

(52) U.S. Cl.
CPC ......... *G08B 13/19663* (2013.01); *G08B 7/06* (2013.01); *G08B 13/08* (2013.01); *G08B 13/1672* (2013.01); *G08B 25/00* (2013.01)

(58) Field of Classification Search
CPC .............. G08B 13/19663; G08B 13/08; G08B 13/1672; G08B 7/06; G08B 25/00
See application file for complete search history.

(56) References Cited

U.S. PATENT DOCUMENTS

| | | | | | |
|---|---|---|---|---|---|
| 6,442,484 | B1 * | 8/2002 | Miller | B60R 21/0134 | 701/532 |
| 7,471,192 | B2 * | 12/2008 | Hara | B60R 25/25 | 340/425.5 |
| 7,532,107 | B2 * | 5/2009 | Hara | B60R 25/00 | 307/10.6 |

(Continued)

FOREIGN PATENT DOCUMENTS

| | | |
|---|---|---|
| CN | 1910633 A | 2/2007 |

*Primary Examiner* — Hoi C Lau
(74) *Attorney, Agent, or Firm* — Frank Lollo; Price Heneveld LLP

(57) ABSTRACT

A monitoring system for a vehicle includes a plurality of surveillance sensors in connection with the vehicle and configured to capture sensor data proximate to the vehicle. A position sensor is configured to detect a location of the vehicle. A controller determines a surveillance mode for the vehicle based on the sensor data and a plurality of security factors associated with the location of the vehicle. The controller activates the surveillance mode in response to the security factors and monitors the sensor data. The controller further filters a plurality of security events from a plurality of benign events and selectively outputs alerts in response to the security events and the benign events.

19 Claims, 8 Drawing Sheets

(56) References Cited

U.S. PATENT DOCUMENTS 7,599,769 B2 * 10/2009 Nou ........................ G01S 5/0027 701/32.4
7,688,185 B1 * 3/2010 McKethan ......... G08B 21/0269 340/425.5
9,437,111 B2 * 9/2016 Ignaczak ................ G08G 1/165
9,522,652 B2 * 12/2016 Choi ..................... B60R 25/102
9,555,772 B2 * 1/2017 Walker .................... B60R 25/30
9,600,992 B1 * 3/2017 Kolla ................. G08B 13/1427
9,672,744 B2 * 6/2017 Ignaczak ................ G08B 25/08
9,783,159 B1 10/2017 Potter et al.
9,809,196 B1 * 11/2017 Penilla .................. B60L 53/305
9,843,777 B2 12/2017 Schofield et al.
9,959,731 B2 * 5/2018 Kolla ................. G08B 21/0261
10,089,879 B2 * 10/2018 Ignaczak ................ G08G 1/165
10,202,103 B2 * 2/2019 Munafo .................. G06F 21/88
10,421,437 B1 * 9/2019 Koskan .............. G08B 21/0261
10,486,649 B1 * 11/2019 Bennie ................ B60R 25/1004
10,497,232 B1 * 12/2019 Koskan ................ G08B 13/189
10,562,492 B2 2/2020 Joao
10,800,377 B1 * 10/2020 Weber, Jr. ........... B60R 25/1004
10,807,563 B1 * 10/2020 Hwang ................. B60R 25/102
10,821,938 B1 11/2020 Morrison et al.
10,854,055 B1 * 12/2020 Cornell .................. G06V 20/20
10,867,494 B2 * 12/2020 Koskan .................... G08B 5/36
11,007,979 B1 * 5/2021 Mitchell ................. B60R 25/33
11,164,010 B2 * 11/2021 Turk ...................... G06V 40/10
11,351,961 B2 * 6/2022 Ghannam ............... B60R 25/20
11,532,221 B1 * 12/2022 Rogan .................... G08B 25/00
2003/0151501 A1 * 8/2003 Teckchandani ........ G08B 25/10 340/8.1
2003/0151507 A1 * 8/2003 Andre .................... G08B 25/10 340/568.1
2005/0203683 A1 * 9/2005 Olsen ..................... G08G 1/042 701/29.3
2005/0219042 A1 * 10/2005 Thomson ............ B60R 25/1004 340/666
2006/0049921 A1 * 3/2006 Hara ....................... B60R 25/00 340/426.1
2006/0049925 A1 * 3/2006 Hara ....................... B60R 25/25 340/435
2006/0261931 A1 11/2006 Cheng
2007/0001829 A1 1/2007 Liu
2007/0014439 A1 1/2007 Ando
2007/0109107 A1 5/2007 Liston
2007/0126560 A1 * 6/2007 Seymour ............... B60R 25/252 180/287
2008/0204555 A1 8/2008 Hughes
2009/0309709 A1 * 12/2009 Bevacqua ........... H04W 12/126 340/426.18
2011/0149078 A1 * 6/2011 Fan ...................... H04N 23/661 348/E5.042
2012/0229639 A1 9/2012 Singleton
2015/0042491 A1 * 2/2015 Burnison ............... B60Q 9/008 340/902
2015/0249807 A1 * 9/2015 Naylor ............. G08B 13/19682 348/155
2015/0266452 A1 * 9/2015 Choi ....................... G01S 19/16 340/426.34
2015/0348417 A1 * 12/2015 Ignaczak ................ G08G 1/165 340/435
2016/0144817 A1 * 5/2016 Chambers ........... B60R 21/0136 340/436
2016/0304028 A1 * 10/2016 Hathaway ............. G01S 13/931
2016/0371980 A1 * 12/2016 Ignaczak ................ G08G 1/165
2017/0061761 A1 * 3/2017 Kolla ................. G08B 21/0261
2017/0148295 A1 * 5/2017 Kolla ................. G08B 21/0255
2017/0278399 A1 * 9/2017 Ignaczak ................ G08G 1/166
2018/0052462 A1 * 2/2018 Arena ................... H04W 4/029
2018/0081357 A1 * 3/2018 Datta Gupta .......... G05D 1/021
2018/0186334 A1 * 7/2018 Munafo .................. B60R 25/24
2018/0249130 A1 * 8/2018 Arena .................... H04N 7/185
2018/0300675 A1 * 10/2018 Arena ................ G07C 9/00182
2019/0202400 A1 * 7/2019 Shimizu ................. G08B 25/10
2020/0062274 A1 * 2/2020 Kowal ..................... G07C 5/02
2020/0189459 A1 * 6/2020 Bush ................... G06F 18/2163
2020/0279461 A1 * 9/2020 Koskan .................... G08B 3/10
2020/0286370 A1 * 9/2020 Wickramarathne .......................... G08G 1/0112
2020/0334631 A1 * 10/2020 Conlon .................. G08B 25/10
2020/0353938 A1 * 11/2020 Stenneth .............. G07C 5/0816
2021/0056206 A1 * 2/2021 Hirano .................. H04W 12/12
2021/0122330 A1 * 4/2021 Sung ..................... B60R 25/305
2021/0229629 A1 * 7/2021 Ghannam .............. B60N 2/002
2021/0287017 A1 * 9/2021 Turk .................... G07C 5/0866
2021/0344700 A1 * 11/2021 Ueno ...................... H04L 67/12
2022/0012988 A1 * 1/2022 Avadhanam ........... G08G 1/166
2022/0032945 A1 * 2/2022 Schumacher ..... B60W 30/0956
2022/0136847 A1 * 5/2022 Higuchi ............. G01C 21/3461 340/932.2
2022/0150675 A1 * 5/2022 Sakamoto ............... H04W 4/38
2022/0250582 A1 * 8/2022 Ilieva ..................... G08B 13/00
2022/0348165 A1 * 11/2022 Khamis ............... B60R 25/1003
2022/0379846 A1 * 12/2022 Munafo ................. G06N 3/042
2023/0054457 A1 * 2/2023 Rogan ...................... G08B 7/06
2023/0260398 A1 * 8/2023 Zhou .................... G08G 1/0141 340/425.5

* cited by examiner

SYSTEM AND METHOD FOR VEHICLE SECURITY MONITORING

CROSS-REFERENCE TO RELATED APPLICATIONS

This application is a continuation of U.S. application Ser. No. 17/394,910 entitled SYSTEM AND METHOD FOR VEHICLE SECURITY MONITORING, filed on Aug. 5, 2021, by Douglas Rogan et al., now U.S. Pat. No. 11,532,221, the entire disclosure of which is incorporated herein by reference.

FIELD OF THE DISCLOSURE

The disclosure generally relates to a vehicle monitoring system and, more particularly, to a security system for monitoring a local environment and cargo of a vehicle.

BACKGROUND

Vehicles may be used in a variety of environments. However, typical vehicle systems operate the same regardless of changes in their operating environment. The disclosure provides for a monitoring system for vehicles that provides for various improvements that may be particularly beneficial for monitoring vehicle cargo.

SUMMARY

According to one aspect of the disclosure, a monitoring system for a vehicle incudes a plurality of surveillance sensors in connection with the vehicle and configured to capture sensor data proximate to the vehicle. A position sensor is configured to detect a location of the vehicle and a controller is in communication with the surveillance sensors and the position sensor. In operation, the controller calculates a security score in response to security data based on the location of the vehicle. The security score is calculated based on a plurality of security factors. The controller further selects an active mode for the surveillance sensors in response to the security score. The active mode is selected from a plurality of surveillance modes comprising a first mode and a second mode. The second mode has an increase in active operation of the surveillance sensors relative to the first mode. The controller further changes the act of the mode from the first mode to the second mode in response to a security detection in the first mode.

Embodiments of the first aspect of the invention can include any one or a combination of the following features:

- The security factors comprise a theft activity factor identified by the controller in response to the location.
- The security factors comprise an isolation factor indicating an activity level of human activity identified based in response to the location.
- The security factors comprise an ambient light factor identified in response to at least one of a time of day and a light level detected in the location by an ambient light sensor.
- The security factors comprise a parking area identification that indicates a parking security factor based on a relative level of security of a street, a lot, or a parking structure corresponding to the location of the vehicle.
- A communication circuit configured to communicate with a remote database in communication with the controller, wherein the controller accesses the security data identifying a factor score for one or more of the security factors via the remote database.
- The plurality of surveillance sensors comprises at least one of a door latch sensor and an interior cabin transducer; and the controller further monitors for an unauthorized physical access attempt to enter the vehicle via the door latch sensor or the cabin transducer in the first mode.
- The plurality of surveillance sensors comprises at least one of a sound transducer and a proximity sensor, and the controller further monitors for changes in a presence of objects proximate to the vehicle at the second surveillance mode.
- The controller further changes the active mode from the second mode to a third mode in response to the change in the presence of the detected objects in the second mode.
- The plurality of surveillance sensors comprises at least one image sensor that captures image data proximate to the vehicle, and the controller further monitors the image data captured proximate to the vehicle and detects a human form via a pose detection routine.
- The controller identifies a loitering person proximate to the vehicle in the image data via the pose detection routine indicating the human form within a predetermined distance of the vehicle for a predetermined loitering time.
- The controller communicates a loitering alert to a remote device in response to the identification of the loitering person.
- The controller activates an output device of the vehicle comprising at least one of a light, speaker, and a horn in response to the identification of the loitering person.
- The controller identifies a trespassing person entering the cargo hold via the pose detection routine in response to detecting a portion of the human form accessing the cargo hold in the image data.
- The pose detection routine comprises classifying an object detected in the image data as a plurality of interconnected joints that correspond to a kinematic model of a human body.
- The controller, in response identifying the trespassing person, communicates a trespass alert to a remote device.

According to another aspect of the disclosure, a method for controlling a security system of a vehicle is disclosed. The method includes identifying a location of the vehicle and calculating a security score in response to security data based on the location of the vehicle. The security score is calculated based on a plurality of security factors. The method further includes selecting an active mode for the surveillance sensors in response to the security score. The active mode is selected from a plurality of surveillance modes comprising a first mode and a second mode. In the first mode, the surveillance sensors are monitored for a physical access attempt into the vehicle. In the second mode, the surveillance sensors are monitored for changes in a presence of objects proximate to the vehicle. The method further includes changing the active mode from the first mode to a second mode in response to a security detection in the first mode. In some implementations, the plurality of surveillance modes may further include a third mode. The third mode may include capturing image data depicting a cargo hold of the vehicle. Based on the image data, the method may further monitor the image data for a portion of a human body entering the cargo hold.

According to yet another aspect of the invention, a monitoring system for a vehicle includes a plurality of surveillance sensors in connection with the vehicle and configured to capture sensor data proximate to the vehicle. The surveillance sensors may include at least one image senor with a field of view that captures image data representing a cargo hold of the vehicle. The system further includes a position sensor configured to detect a location of the vehicle and a controller in communication with the surveillance sensors, the position sensor, and a communication circuit. In operation, the controller calculates a security score in response to security data based on the location of the vehicle. The controller further selects an active mode for the surveillance sensors in response to the security score. The active mode is selected from a plurality of surveillance modes and at least one of the surveillance modes includes a procedure of monitoring the image data depicting the cargo hold of the vehicle. The controller further identifies human activity in the image data via a pose detection routine. The pose detection routine includes classifying an object detected in the image data as a plurality of interconnected joints that correspond to a kinematic model of a human body. The controller identifies the human activity as a trespassing person accessing the cargo hold in response to identifying one or more of the interconnected joints entering the cargo hold as depicted in the image data. The controller further communicates the detection of the trespassing person to a remote device by the communication circuit. In some instances, the human activity detected by the controller may further include a loitering person detected proximate to the vehicle. In such cases, the controller may be further configured to distinguish the human activity between the loitering person proximate to the vehicle and the trespassing person accessing the vehicle in response to identifying the one or more of the interconnected joints entering the cargo hold in the image data.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
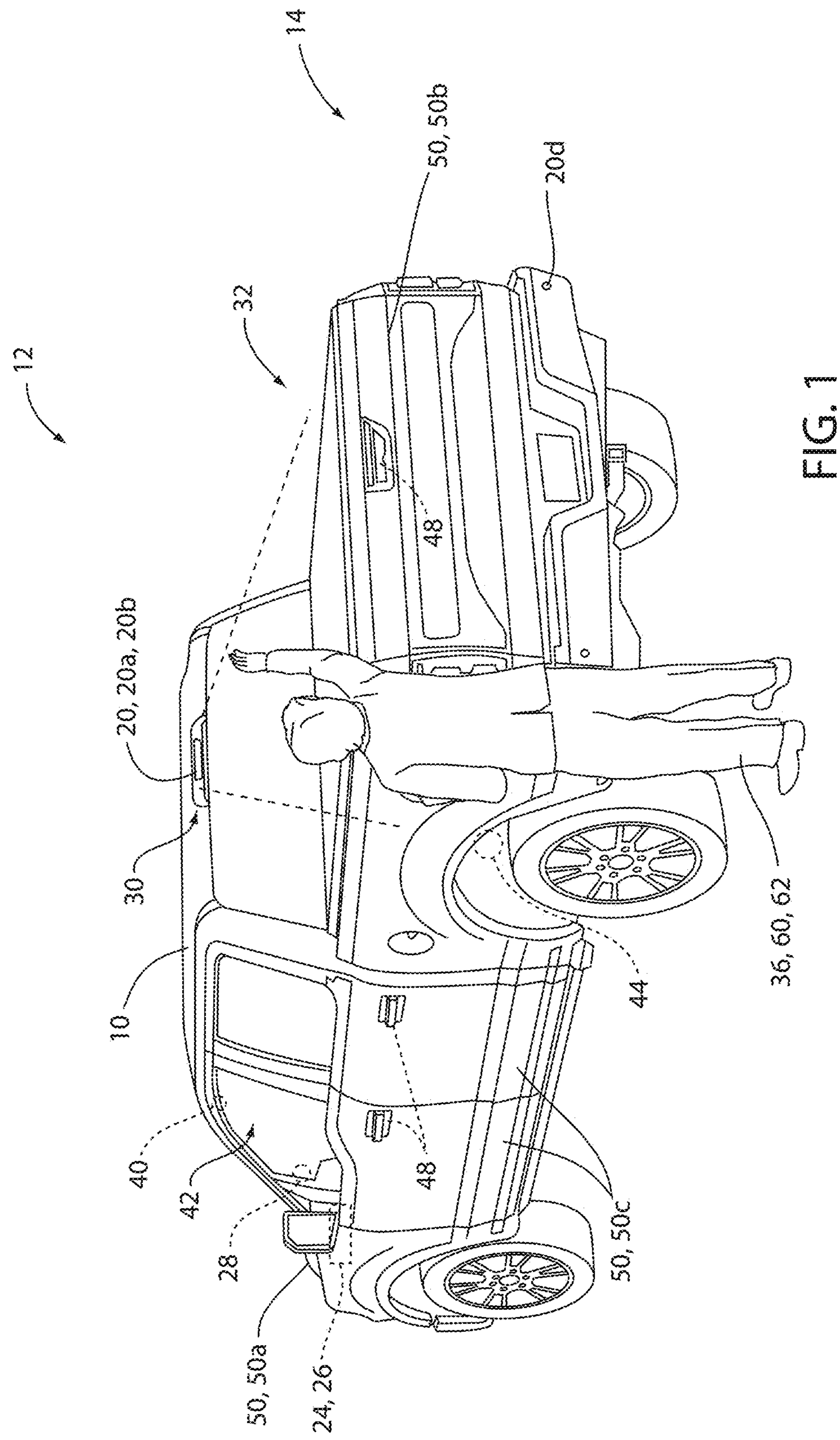
FIG. 1 is a projected environmental view of a vehicle including a surveillance or monitoring system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Figure 2:
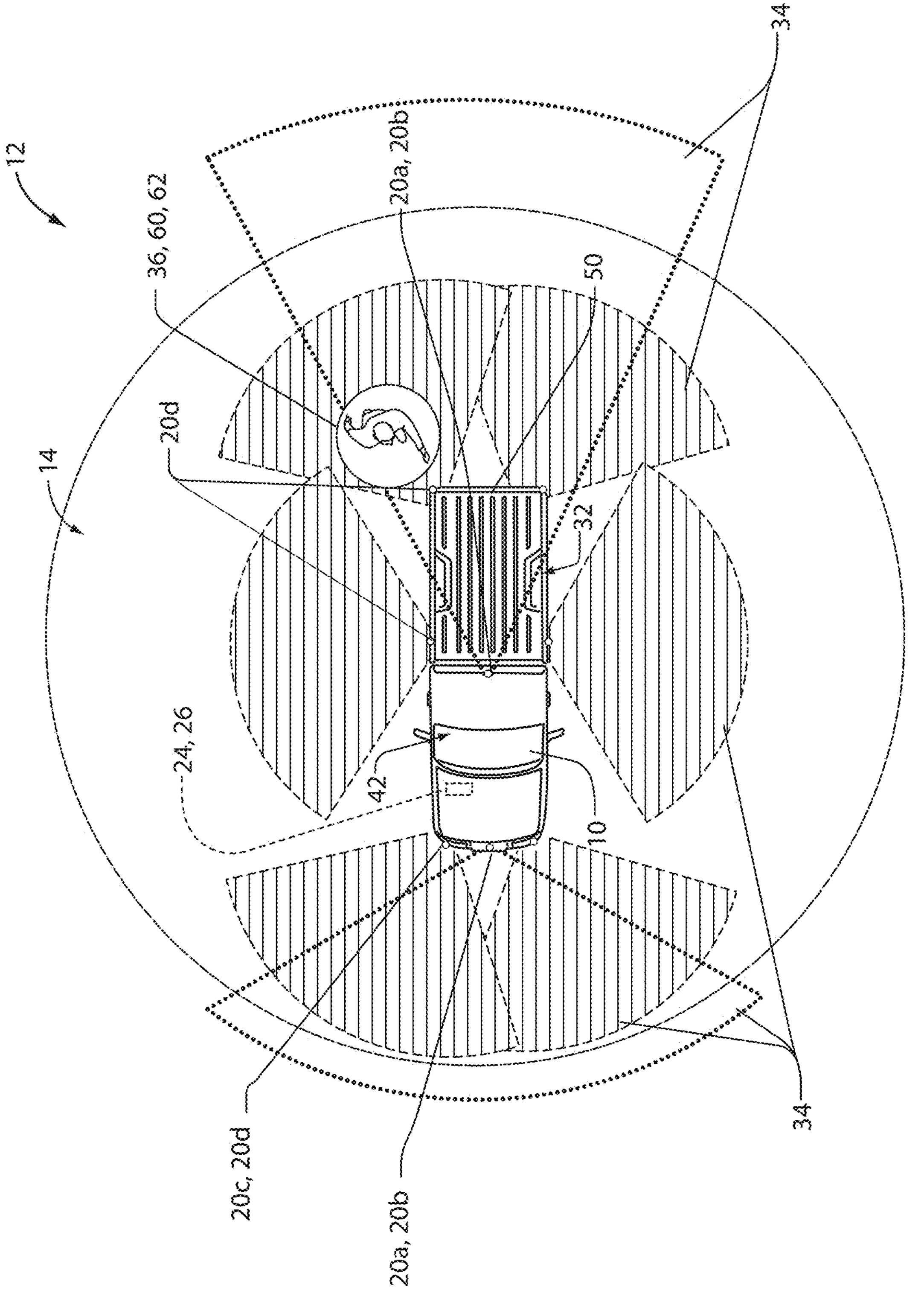
FIG. 2 is a plan view of a vehicle comprising a monitoring system.

Referring generally to FIGS. 1 and 2, a vehicle 10 is shown demonstrating an exemplary embodiment of a surveillance or monitoring system 12. In various implementations, the monitoring system 12 may provide for various operating or surveillance modes that can be selectively activated by a controller of the system 12. The controller 24 may select an active surveillance mode based on a security score associated with a location and the related activity in a local environment of the vehicle 10. The calculation of the security score may be based on a plurality of security factors that are quantified and combined to provide a composite score representative of the relative security of a local environment 14 of the vehicle 10. The security factors may include a variety of metrics determined based on data describing human activity at the location and/or information detected by one or more surveillance sensors 20 of the vehicle 10 and the monitoring system 12.

Based on the security score, a controller 24 of the monitoring system 12 may determine a level of monitoring or extent of activation of the surveillance sensors 20. The adjustment of the level of monitoring may be particularly meaningful in the context of efficiently utilizing stored power associated with a battery or power supply of the vehicle 10. For example, each of the surveillance modes may provide for a balance of power use associated with the operation of the monitoring system 12 that is suited to the security risk identified by the security score. Each of the surveillance modes may provide for variations in a level of surveillance coverage, intensity, and/or frequency, which may result in increased power demands or current draw from the battery or power supply. By adjusting the intensity of the monitoring in the surveillance modes, the disclosure provides for increased surveillance and active operation of the surveillance sensors 20 in response to the location of the vehicle 10 being identified with an increased risk indicated by the security score. In this way, the monitoring system 12 may provide for improved monitoring and security of the vehicle 10 while limiting unnecessary power drawn from a battery or power supply of the vehicle 10.

In various implementations, the security factors from which the security score is calculated may include a variety of inputs or metrics that may be representative of the relative security of the location and the local environment 14 of the vehicle 10. For example, a security factor may include a theft activity factor that may be accessed by the system 12 via a remote database (e.g., a crime statistics database, vehicle security reporting network, etc.) to identify a level of theft or criminal activity in the location of the vehicle 10. Another security factor that may be incorporated in the calculation of the security score is an isolation factor. The isolation factor may relate to a quantity or constancy or vehicle or foot traffic attributed to the location of the vehicle 10 and may vary based on a time of day. Yet another security factor may include a parking area identification that indicates a parking security factor which may also be identified based on the location of the vehicle. For example, based on the location of the vehicle, a controller of the system 12 may identify that the vehicle is parked in a street location, an open parking facility, or a secured parking facility. A secure parking facility may be assessed and improve the score compared to a street parking location, which may be quantified by the parking security factor. Accordingly, the security factors utilized to calculate the security score may be dependent upon a location of the vehicle 10, time of day, historic activity and other information that may vary significantly with the location of the vehicle 10. The location may be identified by a controller of the monitoring system 12 based upon a position sensor (e.g., a global positioning system sensor). Further details of the controller 24, the surveillance sensors 20, the position sensor 26, and various other aspects of the monitoring system 12 are depicted and discussed in reference to the block diagram shown in FIG. 6.

In an exemplary implementation, the controller 24 may additionally process information recorded by one or more of the surveillance sensors 20 and/or various sensors of the vehicle 10 to identify additional security factors to calculate the security score. For example, a level of ambient light in the local environment 14 of the vehicle 10 may be identified via an ambient light sensor 28 of the vehicle 10. The ambient light sensor 28 may be configured to detect the lighting conditions of the local environment 14 associated with a daylight condition and/or an intensity of artificial light illuminating the local environment 14, which may be informative as factors implemented in the security score. Similarly, the surveillance sensors 20 may be implemented to identify a frequency of traffic in the form of pedestrians or passing vehicles to further indicate the level of human activity associated with the isolation factor of the security factors. Accordingly, various sensors of the vehicle 10 and the surveillance sensors 20 of the monitoring system 12 may be flexibly implemented to assess the relative security of the location in which the vehicle 10 is parked or located. In this way, the security score may instruct the controller 24 to activate an appropriate level or mode of surveillance for the location, timing, and setting of vehicle 10.

In general, the security score may be calculated based on a weighted combination of each of the security factors. That is, each of the security factors may be associated with a factor score or composite value, which may be weighted in the overall security score by a multiplier or coefficient. The coefficient of each of the factors may indicate a relative importance or weight of each of the security factors in identifying the security score. In operation, each of the surveillance modes may be activated in response to the security score varying over a spectrum of values associated with a range of values of each of the individual security factors, the coefficients, and the resulting combined security scores associated with the weighted combinations. For example, a security score may increase or decrease depending on the scoring method to indicate the relative security or level of threat for each location. That is, a low score may indicate a low level of security or a high level of security. The nature of the security score accordingly may be for relative comparison and shall not be considered limited to a specific magnitude attributed to the comparative level of security. Accordingly, the surveillance mode of the system 12 may be adjusted in response to a relative value of the security score compared to one or more security threshold values.

Referring still to FIGS. 1 and 2, the surveillance sensors 20 are discussed in further detail. In general, the surveillance sensors may include a variety of sensory technologies. For example, the surveillance sensors 20 may include visible light image sensors **20*a*, infrared sensors 20*b*, radar sensors 20*c*, ultrasonic sensors 20*d*, and/or various types of sensors that may be suitable to detect the activity of objects passing within the local environment 14 of the vehicle 10. As discussed herein, the image sensors 20*a* may include at least one camera module positioned proximate to a center high mount stop light (CHMSL) or a rear roof portion 30 above a rear windshield of the vehicle 10. Accordingly, the image sensors 20*a*, as well as the other surveillance sensors 20, may be arranged about a perimeter of the vehicle 10 and the roof portion 30, such that the image data or sensor data can be captured in the local environment 14 as well as a cargo hold 32 (e.g., truck bed, storage container, toolbox, etc.) of the vehicle 10**.

As demonstrated in FIG. 2, the various sensory technologies may include varying operating or detection ranges demonstrated as detection zones 34 in the local environment 14. The ranges of the detection zones 34 and monitoring capability of the surveillance sensors 20 may be functions of the sensory technologies and design of the surveillance sensors 20. The capability of each of the sensors or sensory technologies may be readily determined by the technical specifications of the devices implemented in specific products as shall be understood. The sensor data captured by the surveillance sensors 20 in the detection zones 34 may be monitored in various combinations by the controller 24 to detect vehicles, pedestrians 36, and/or various other objects that may be located proximate to the vehicle 10. As discussed herein, the local environment 14 may correspond to a region within approximately 5 m-15 m of the vehicle 10. In some cases, the surveillance sensors 20 may be configured to capture the sensor data in a more immediate proximity to the vehicle 10 within 5 m, 3 m, or less depending on a monitoring range selected for a specific application of the system 12. Additionally, the monitoring range may increase as the surveillance mode of the system 12 is adjusted or increased to monitor varying portions of the local environment 14.

In addition to the surveillance sensors 20, various additional sensory devices of the vehicle 10 may be in communication with or otherwise incorporated in the monitoring system 12. For example, an audio transducer 40 or microphone may be monitored by the controller 24 to identify changes in noise in the local environment 14, which may suggest elevated levels of security risk. The audio transducer 40 may be disposed in a passenger compartment 42 of the vehicle 10, such as a microphone of a hand-free phone system. Additionally, the vehicle 10 may be equipped with a suspension sensor 44 that may be monitored by the controller 24 to identify variations in a load which may be stored in the passenger compartment 42 and/or cargo hold 32 (e.g., a truck bed or storage compartment) of the vehicle 10. By monitoring variations in the load of the vehicle 10 as reported by the suspension sensor 44, the controller 24 may identify additional security factors or suspicious activity that may be incorporated as factors to calculate the security score and/or instances of security detections or breaches that may trigger alerts or notifications from the monitoring system 12.

In some implementations, the controller 24 of the monitoring system 12 may additionally monitor detections by one or more latch sensors 48, which may detect a closure status of one or more closures 50 (e.g., a hood 50*a*, a tailgate 50*b*, a door 50*c*, a trunk, etc.) of the vehicle 10. Though discussed generally as sensors associated with the vehicle 10, each of the audio transducer 40, the suspension sensor 44, the latch sensor 48, and other related sensors of the vehicle 10 may generally be referred to as the surveillance sensors 20 for clarity. Accordingly, by monitoring activity detected by each of the surveillance sensors 20, the controller 24 of the monitoring system 12 may identify various activities that may correspond to security factors used to calculate a security score and/or security detections that may trigger a response of the monitoring system 12.

As previously discussed, the monitoring system 12 may activate a surveillance mode for the surveillance sensors 20 based on the security score. As further discussed in reference to FIGS. 4A-4C, the specific operation of each of the surveillance sensors 20, as well as the response of the monitoring system 12 to various security detections or security breaches, may vary considerably depending upon the surveillance mode activated in response to the calculated security score. For example, in response to the security score, the controller 24 of the system 12 may activate one of a plurality of security or surveillance modes. Each surveillance mode may activate the operation of the surveillance sensors 20 according to an associated risk identified by the security score. In general, the operation of the surveillance sensors 20 and monitoring by the controller 24 may increase incrementally in response to the security score indicating increased threat or security levels for the vehicle 10. For example, in a first mode of the surveillance modes, the surveillance sensors 20 may be monitored for a physical access attempt into the vehicle. Such an access attempt may be detected in response to a spike in volume detected by the audio transducer 40, an attempted entry into the passenger compartment 42, or the cargo hold 32 identified by the latch sensor 48, and/or a change in the load of the vehicle 10 identified by the suspension sensor 44. Accordingly, the first mode may provide for limited advanced indication of a security breach to the vehicle 10 but may be activated in instances where the security score for the location of the vehicle 10 indicates a high level of security in the local environment 14. In such situations, the controller 24 of the monitoring system 12 may apply the first mode with limited advanced monitoring in order to limit the power usage associated with the monitoring system 12.

In response to an elevated level of security risk identified by the security score, the controller 24 may activate a second surveillance mode, which may further monitor for changes in the presence of objects in the local environment 14 proximate to the vehicle 10. The monitoring of the changes of the objects (e.g., the pedestrian 36) may be detected by periodically activating one or more of the surveillance sensors 20. The periodic activation may be efficiently applied, in particular, to one or more of the infrared sensors 20*b*, radar sensors 20*c*, and/or the ultrasonic sensors 20*d*. Each of these sensors may generally detect a presence and range of one or more objects proximate to the vehicle 10 through periodic activation spaced over a staggered time interval. For example, each of the surveillance sensors 20 may be activated periodically every two, five, ten, or even twenty seconds and still provide reliable information to the controller 24 regarding the changing presence of object in the local environment 14. Similarly, the controller 24 may periodically activate the image sensors 20*a* and capture image data representative of the local environment 14; however, processing of image data and comparative analysis may require additional power that may not be suitable for the monitoring of all vehicles 10. In any case, in the second mode or intermediate mode of surveillance, the controller 24 of the monitoring system 12 may periodically review and compare the information captured by the surveillance sensors 20 to identify security threats for detection in the local environment 14.

In response to the security score indicating that an elevated level of security or precaution is justified based upon the position of the vehicle 10, the controller 24 may activate a third surveillance mode, which may correspond to a critical or elevated level of surveillance. In the third mode, the controller 24 may activate the image sensors 20*a* to consistently monitor image data depicting the local environment 14 for changes. As demonstrated in FIG. 3, the controller 24 may process image data captured by the image sensors 20*a* to identify one or more persons or objects with features corresponding to human forms in order to identify potential security threats or security detections. In operation, the controller 24 may identify or distinguish a human form from other objects based on one or more recognition techniques that may include human pose estimation based on edge detection or various deep learning based approaches.

Figure 3:
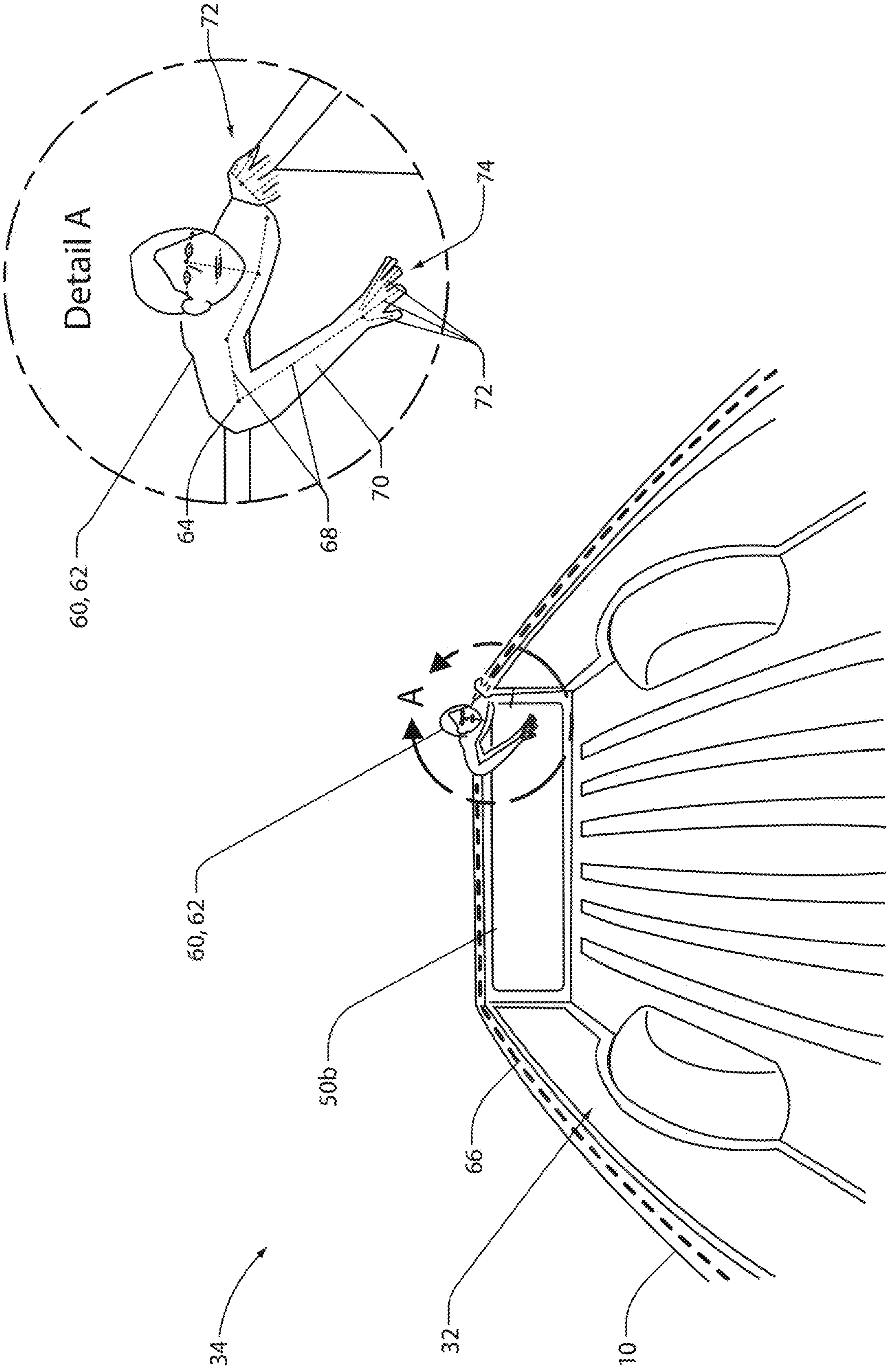
FIG. 3 is a depiction of image data captured by an imager of a monitoring system of a vehicle demonstrating a trespasser entering a cargo hold.

For example, as depicted in FIG. 3, an object 60 may be identified by the system 12 as a potential trespasser 62 based on a pose detection indicating that one or more interconnected joints 64 corresponding to a kinematic model of a human body have entered a perimeter 66 of the cargo hold 32. Such a detection may generally be accomplished by detecting connected limbs of a human body and associating them with a collection of templates corresponding to part-based models for kinematic articulation of a human body. In some cases, pose detection may be accomplished via one or more deep learning based approaches, such as DeepPose, MPII Human Pose, Open Pose, Real Time Multi-Person Pose Estimation, Alpha Pose, etc. Pose estimation or recognition via deep learning based approaches may include various regression techniques that may be utilized to estimate objects corresponding to parts of the human body as the interconnected joints 64 demonstrated in FIG. 3. The interconnected joints 64 are shown connected via body segments 68 which may correspond to limbs 70 and/or digits 72 of a hand 74. Once identified in the image data captured by the image sensors 20*a*, the controller 24 may identify that a human form is present in the local environment 14 in order to identify the trespasser 62, a loitering person, and/or a passerby (e.g., the pedestrian 36). Accordingly, in the third surveillance mode, the monitoring system 12 may be activated to process image data depicting the local environment 14, particularly the cargo hold 32 of the vehicle 10, to identify if the trespasser 62 is impermissibly accessing the vehicle 10.

Figure 4A:
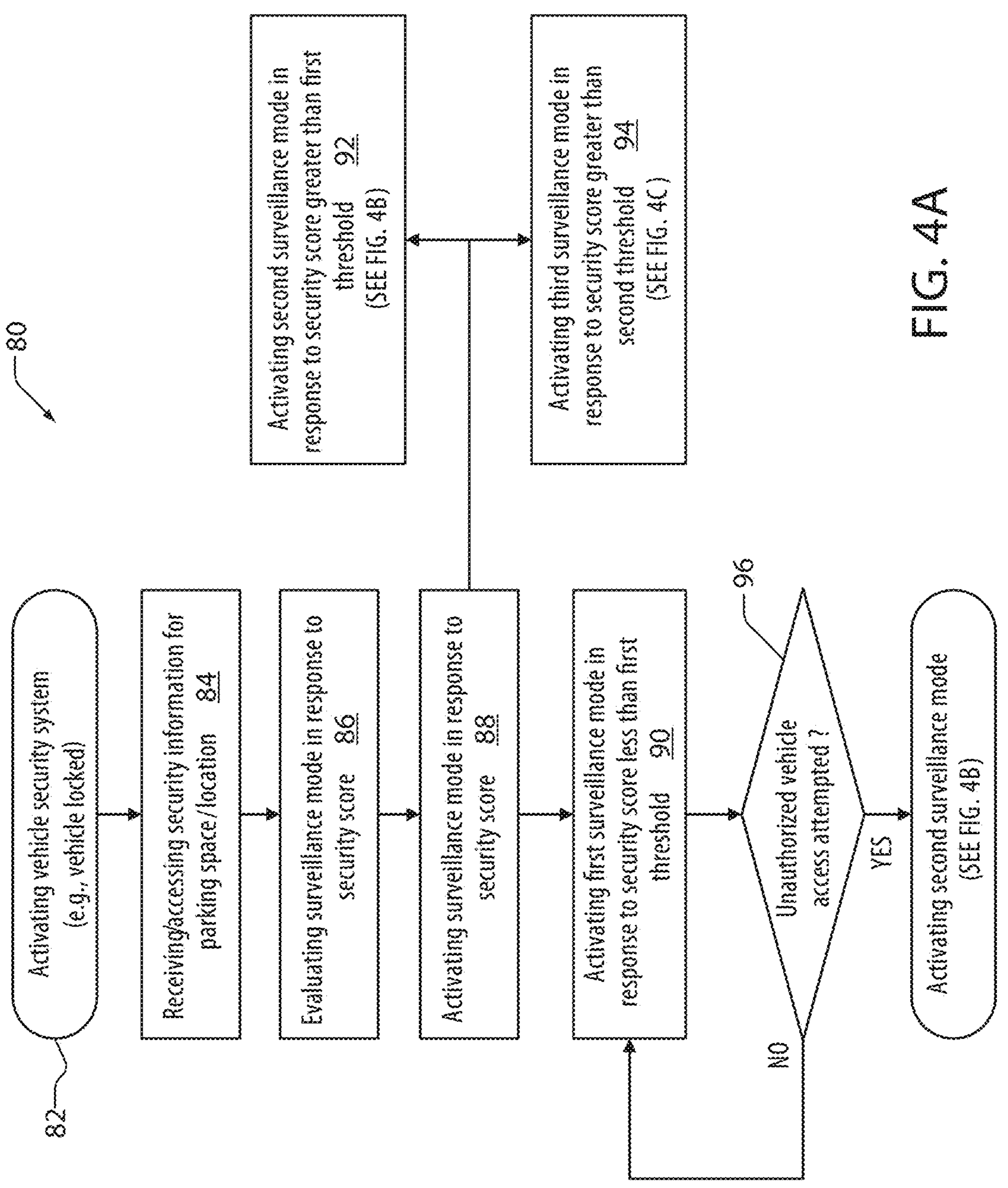
FIG. 4A is a flow chart demonstrating a monitoring routine for a monitoring system for a vehicle.
Figure 4B:
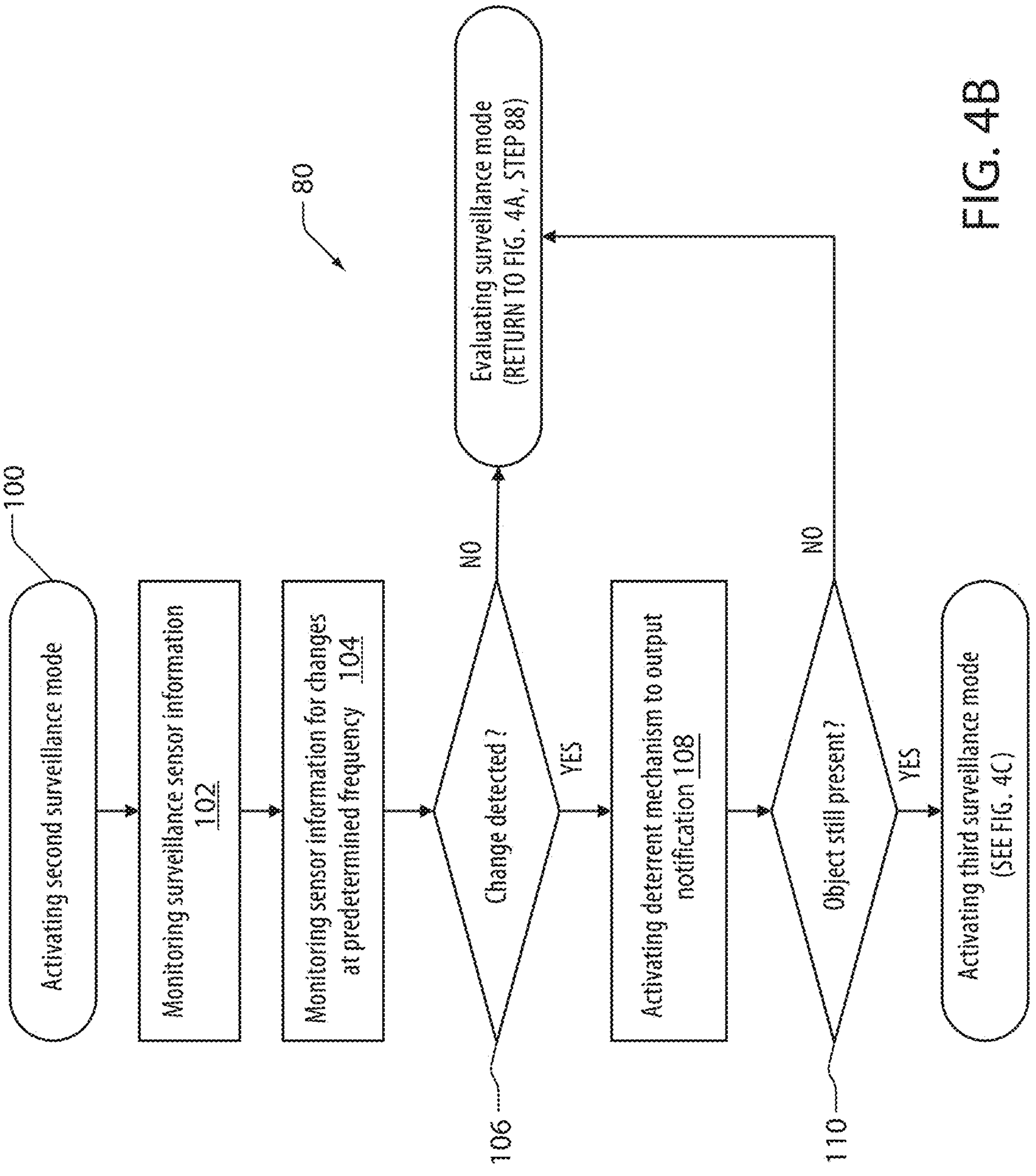
FIG. 4B is a flow chart demonstrating a monitoring routine for a monitoring system for a vehicle.
Figure 4C:
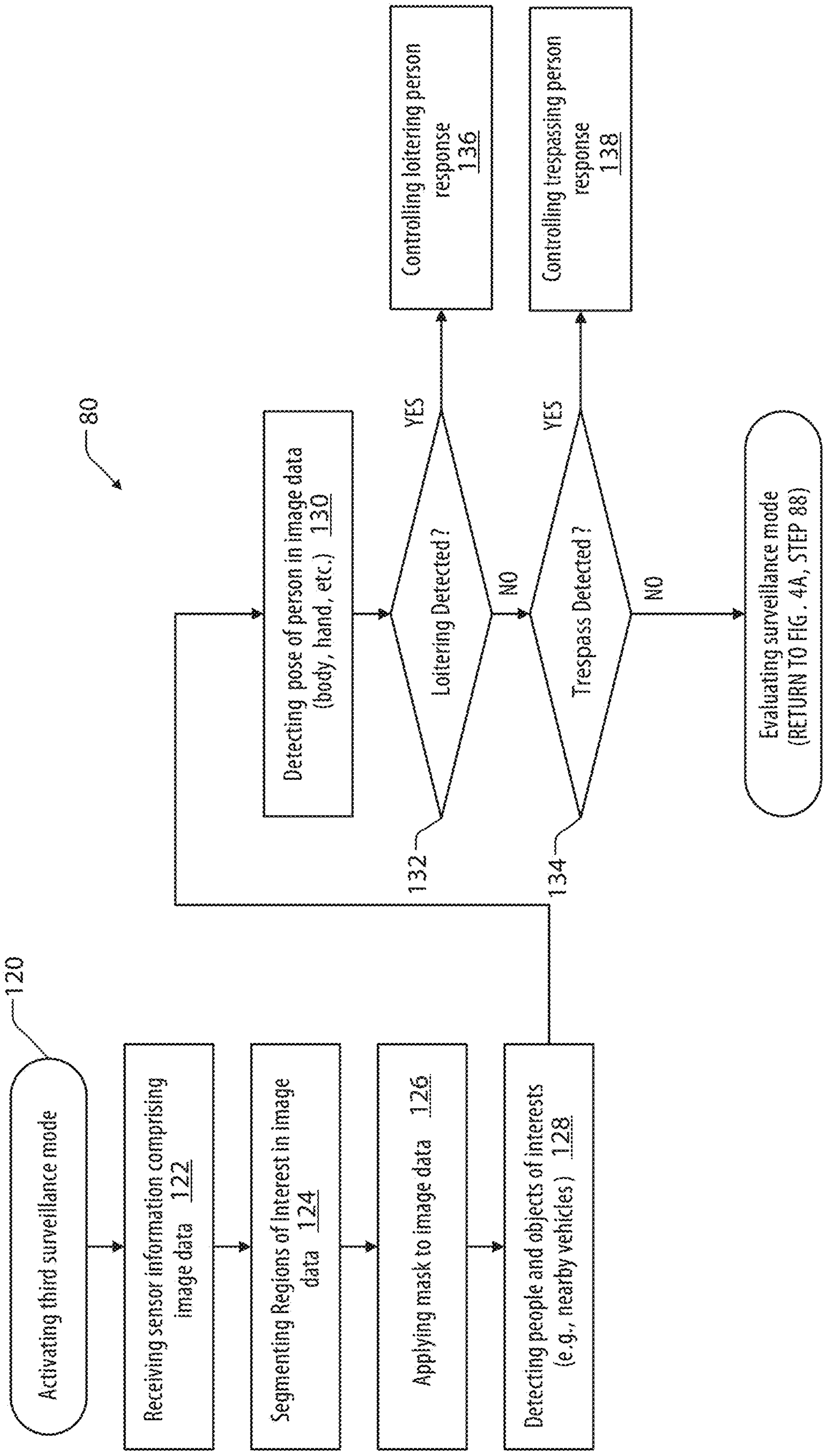
FIG. 4C is a flow chart demonstrating a monitoring routine for a monitoring system for a vehicle.

As provided in various examples, the disclosure provides for the monitoring system 12 to identify and calculate a security score based on various security factors and control a surveillance mode corresponding to the security score. Referring now to FIGS. 4A-4C, a detailed exemplary surveillance routine 80 for the monitoring system 12 is discussed in reference to the flow charts shown. In general, the surveillance routine 80 may begin in response to the activation of a security system of the vehicle 10 (82). Once the security system is activated or the vehicle 10 is locked, the controller 24 may identify the location of the vehicle via the position sensor 26 and access security information based on the location of the vehicle 10 (84). As previously discussed, the security information related to the location of the vehicle 10 may relate to a variety of security factors that may include a theft-activity factor, an isolation factor, an ambient light factor, a parking security factor, and various other factors as discussed herein. As previously discussed, the security factors may correspond to a variety of factors identified by the controller 24 to determine a risk level associated with the location of the vehicle 10. For example, the theft-activity factor may include a measure of crime statistic database, the isolation factor that may indicate a level of human activity, a parking security factor indicating if the vehicle 10 parked in a street location, an open parking facility, or a secured parking facility, etc. Accordingly, the system 12 may adjust the security score based on various factors identified for the location of the vehicle 10.

Once the security factors are identified, the security score may be calculated by the controller 24 based on a weighted average of the various factors indicative of the security of the vehicle 10 (86). Based on the security score, the controller 24 may activate a surveillance mode corresponding to one of a plurality of predetermined operating configurations for the surveillance sensors 20. As shown in FIG. 4A, one of three exemplary surveillance modes may be activated in steps 90, 92, and 94. The first surveillance mode demonstrated in step 90 may be activated in response to a security score less than a first threshold. The second surveillance mode may be set in step 92 in response to a security score greater than the first threshold. The third surveillance mode may be set in step 94 in response to the security score being greater than or exceeding a second threshold. As previously discussed, the security score may equivalently be denoted as descending as the level of threat or risk increases. Accordingly, the surveillance modes may be equivalently activated in response to the security score being less than a first and second threshold. The second surveillance mode and third surveillance modes are further discussed in FIGS. 4B and 4C, respectively.

In the first surveillance mode following step 90, the controller 24 may monitor the surveillance sensors 20 for an unauthorized vehicle access attempt in step 96. For example, in the first surveillance mode, the surveillance sensors 20 may be activated and monitored for a physical access attempt into the vehicle. Such an access attempt may be detected in response to a spike in volume detected by the audio transducer 40, an attempted entry into the passenger compartment 42 or the cargo hold 32 identified by the latch sensor(s) 48, and/or a change in the load of the vehicle 10 identified by the suspension sensor 44. If an unauthorized vehicle access attempt is not detected in step 96, the first surveillance mode can continue to monitor the surveillance sensors 20 in step 90. The first surveillance mode may correspond to a low power usage mode activated in response to a security score corresponding to relatively low-risk conditions. In response to an unauthorized vehicle access attempt in step 96, the controller 24 may activate the second surveillance mode, as further discussed in reference to FIG. 4B.

Referring now to FIG. 4B, the second surveillance mode can be activated in step 100. In operation, the second surveillance mode may monitor the surveillance sensors 20 in order to identify changes in the presence of objects in the proximity of vehicle 10 (102). As previously discussed, the second surveillance mode may correspond to an intermittent review or monitoring of the sensor data captured by one or more of the image sensors 20*a*, the infrared sensors 20*b*, the radar sensors 20*c*, and/or the ultrasonic sensors 20*d* (104). The intermittent or periodic review of the sensor information of the predetermined frequency in step 104 may provide for a comparative analysis to be completed by the controller 24 to identify changes in the presence and proximity of objects in the local environment 14 of the vehicle 10. If a change in the objects proximate to the vehicle 10 is detected in step 106, the controller 24 may activate one or more output devices 78 or notifications in step 108 that may serve as deterrent mechanisms to frighten or deter the presence of pedestrians 36 and/or the trespasser 62. Such output devices 78 may include the activation of one or more vehicle lights 78*a*, a horn 78*b*, an alarm 78*c*, or various devices that may output sensor indications to one or more persons in the local environment 14 of the vehicle 10. The output devices 78 (e.g., the vehicle lights 78*a*, horn 78*b*, alarm 78*c*) are demonstrated in FIG. 6 in connection with the monitoring system 12.

If no change is detected in the objects in the local environment 14 of vehicle 10 in step 106, the surveillance routine or method 80 may return to step 88, as demonstrated in FIG. 4A, to evaluate and determine the surveillance mode of the monitoring system 12 based on the security score. Similarly, following step 108, if the object is no longer present in step 110, the method 80 may return to step 88 to continue to reevaluate the surveillance mode based on the security score. Though the location of the vehicle may remain consistent, the security score may change based on various factors, which may include the detection of suspicious objects or persons as further discussed in FIG. 4C as well as variations in ambient light conditions, time, variations in pedestrian/vehicle traffic, etc. Accordingly, the method may include recurring steps to evaluate the surveillance mode by returning to step 86. If the object detected in step 106 is still present following the activation of the deterrent mechanism in step 108, the third surveillance mode (as depicted in FIG. 4C) may be activated in step 120.

Referring now to FIG. 4C, the third surveillance mode may be activated in step 120. In the third surveillance mode, the controller 24 may monitor sensor information comprising image data captured by the image sensors 20*a* (122). The monitoring and processing of the image data in step 122 may be in combination with the monitoring of the various additional surveillance sensors 20 as discussed herein. In order to distinguish one or more loitering persons or passersby (e.g., pedestrians 36), the controller 24 may segment one or more regions of the image data in step 124 and apply a mask to image data falling outside of the cargo hold 32 in step 126. By processing the image data in the specific regions of interest including the cargo hold 32, the controller 24 may be operable to distinguish objects that are trespassing within the cargo hold 32 from those further away from the vehicle 10 in the local environment 14. Accordingly, in step 128, the controller may detect objects and people of interest in the image data and may further apply various methods of pose detection to detect the joints 64 and body segments 68 in the local environment 14 in step 130.

Based on the presence of one or more persons in the local environment 14 of the vehicle 10, the controller may identify a loitering person in step 132 or the trespasser 62 in step 134. A loitering person may correspond to a person present in the local environment 14 as identified by the pose detection routine, for a duration exceeding a predetermined time period. If such a loitering person is detected in step 132, the controller 24 may activate a loitering person response 136. In step 134, the trespasser 62 may be detected, as previously discussed, in response to one or more of the interconnected joints 64 or body segments 68 of a humanoid object or human form entering the perimeter 66 of the cargo hold 32. If such a trespass is detected in step 134, the controller 24 may control a trespassing person response in step 138. If there is no instance of a loitering detection or a trespassing detection in either of steps 132 or 134, the routine 80 may return to step 88 as depicted in FIG. 4A to evaluate the surveillance mode based on the security score as previously discussed. Examples of the loitering person response (136) and the trespassing person response (138) are further discussed in reference to FIGS. 5A and 5B.

Figure 5B:
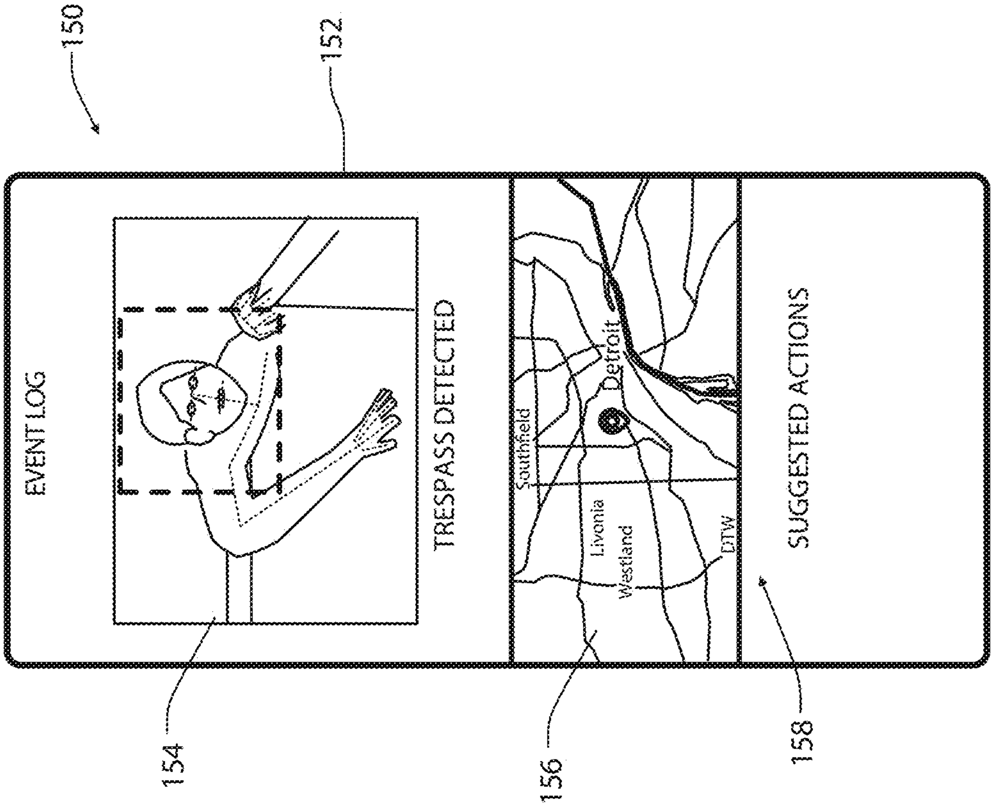
FIG. 5B is a representative depiction of a notification alert displayed on a remote device as communicated from a monitoring system.
Figure 5A:
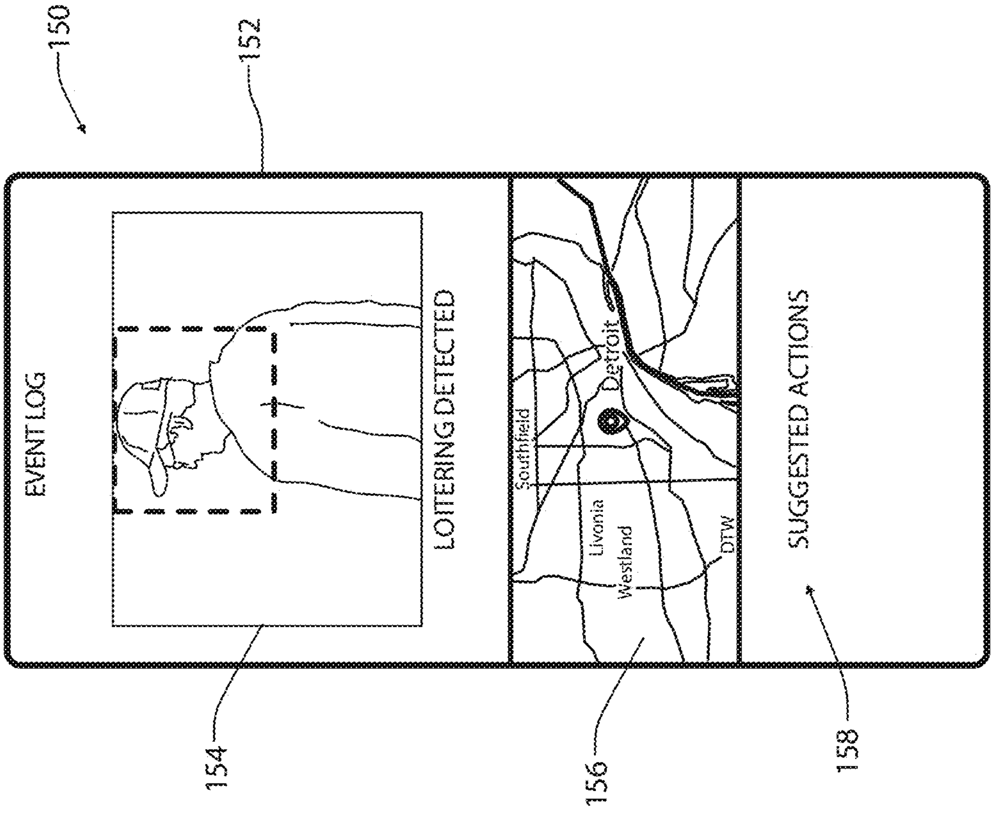
FIG. 5A is a representative depiction of a notification alert displayed on a remote device as communicated from a monitoring system.

Referring now to FIGS. 5A and 5B, examples of the loitering person response 136 and the trespassing person response 138 are shown. Additional aspects of the loitering and trespassing responses 136, 138 may include various activations of the output devices 78 as previously discussed in reference to the activation of the deterrent mechanisms in step 108 of the method 80. Accordingly, the controller 24 of the monitoring system 12 may selectively activate one or more of the output devices 78 including, but not limited to, the lights 78*a*, horn 78*b*, alarm 78*c*, etc.; in response to a proximity detection as previously discussed in step 106 and/or the loitering and trespass detections of steps 132 and 134. In this way, the monitoring system 12 may provide for the output of various notifications or deterrents from the output devices 78 in response to the detection of objects or persons proximate to the vehicle 10.

Figure 6:
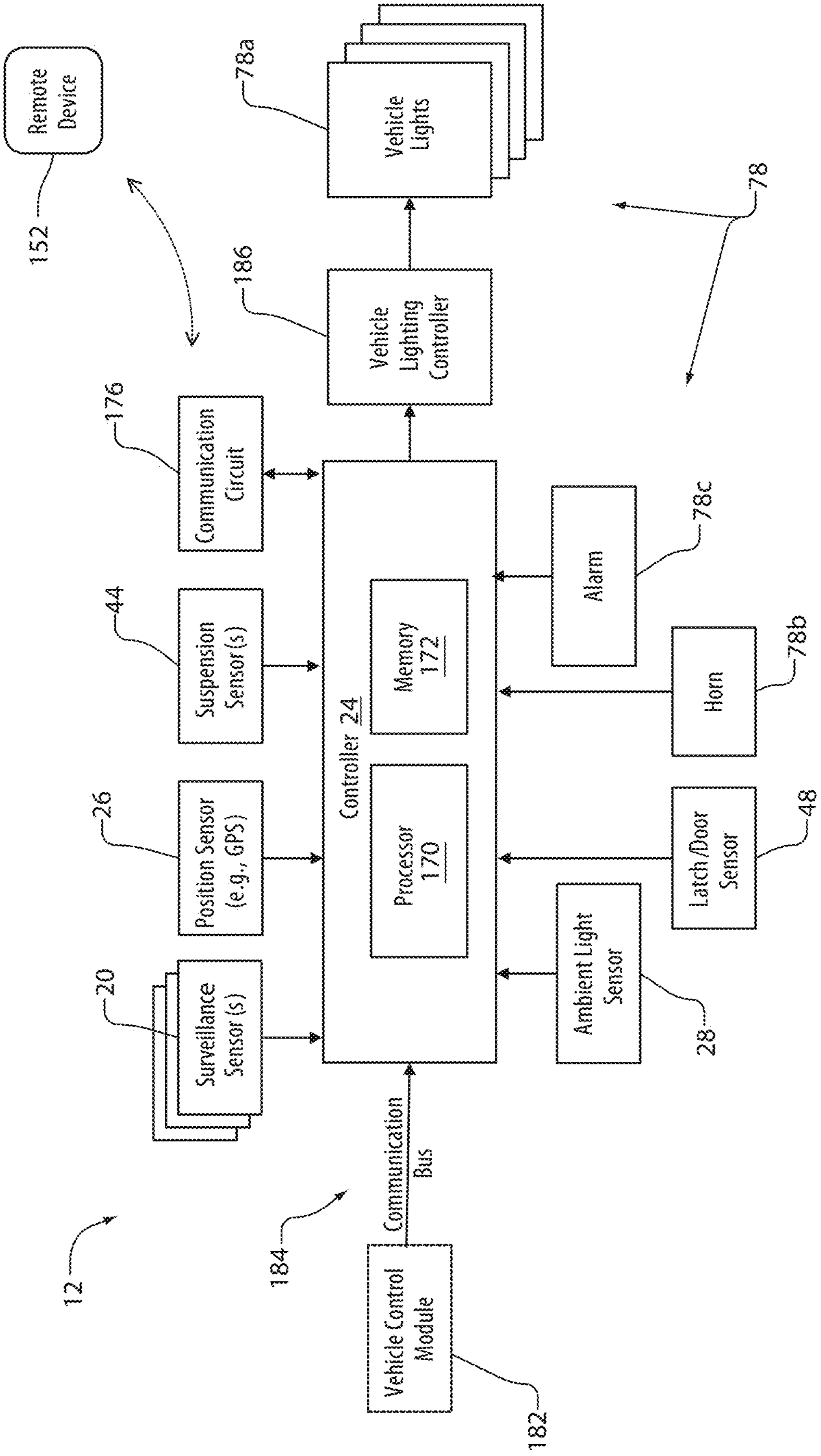
FIG. 6 is a block diagram demonstrating a monitoring system for a vehicle in accordance with the disclosure.

Referring more specifically to FIG. 5A, the loitering person response 136 may further include a notification message 150 that may be communicated from the controller 24 of the monitoring system 12 to a remote electronic device 152 that may be in communication with the controller 24 via a communication circuit 176 as further discussed in reference to FIG. 6. In the exemplary embodiment shown, the notification message 150 for the loitering person response 136 demonstrates representative image data 154 captured by the image sensors 20*a* as well as a detected location 156 where the loitering person was detected. Additionally, the notification message 150 may include suggested actions 158 in response to the loitering detection that may prompt a user of the remote device 152 to follow up with further preventative measures if necessary.

Referring now to FIG. 5B, an example of the notification message 150 generated in response to the trespass detection 134 as the trespassing person response 138 is shown. Similar to the notification message 150 in response to the loitering detection, the notification message 150 in response to the trespassing person may include representative image data 154 demonstrating the trespasser 62 captured via the image sensors 20*a*. The detected location 156 as well as the suggested actions in response to the trespass detection may further be demonstrated in the notification message 150. The remote device 152 may correspond to various forms of computerized or electronic devices that may receive messages via a communication interface. For example, the remote device 152 may correspond to a smart phone, tablet, laptop, computer, etc. Accordingly, the monitoring system 12 may provide notification messages 150 to various remote devices 152 that may prompt a user of the monitoring system 12 to follow up with further actions.

Referring now to FIG. 6, a block diagram of the monitoring system 12 is shown. The system 12 may comprise a controller 24, which may comprise a processor 170 and a memory 172. The processor 170 includes one or more digital processing devices including, for example, a central processing unit (CPU) with one or more processing cores, a graphics processing unit (GPU), digital signal processors (DSPs), field programmable gate arrays (FPGAs), application specific integrated circuits (ASICs) and the like. In some configurations multiple processing devices are combined into a System on a Chip (SoC) configuration while in other configurations the processing devices are discrete components. In some embodiments of the system 12, the processor 170 includes digital processing hardware that is configured to perform acceleration of machine learning processes to generate trained hierarchical neural networks that include various human pose parameters and/or hand pose parameters. In operation, the processor 170 executes program instructions stored in the memory 172 to perform the operations described herein.

In the system 12, the memory 172 is formed from one or more data storage devices including, for example, magnetic or solid state drives and random access memory (RAM) devices that store digital data. The memory 172 holds stored program instructions, sensor data from the surveillance sensors 20 (e.g. image data, proximity detection signals, etc.), as wells an image processing module that may perform various processing tasks on the image data including preprocessing, filtering, masking, cropping and various enhancement techniques to improve detection and efficiency. In operations that include the training of neural networks or machine-learning operations the image processing module may additionally store training data for human or hand pose detection as discussed herein.

As discussed herein, the system may comprise one or more surveillance sensors 20 which may be in communication with a controller 24. The controller 24 may further be in communication with the position sensor 26 (e.g. global positioning system [GPS]). In an exemplary embodiment, the controller 24 may access the map data via the memory 172, the position sensor 26, and/or via wireless communication through a communication circuit 176. The communication circuit 176 may correspond to a communication interface operating based on one or more known or future developed wireless communication technologies. For example, the communication circuit 176 may operate based on one or more protocols including, but not limited, to ZigBee®, WiMAX®, Wi-Fi®, Bluetooth®, and/or cellular protocols (e.g. GSM, CDMA, LTE, etc.). As discussed herein, the controller 24 may be configured to communicate one of more notifications or messages to the remote electronic device 152 via the communication circuit 176. The mobile device 152 may correspond to correspond to a smart phone, tablet, laptop, computer, etc. including communication capability compatible with the communication circuit 176 and/or additional devices in communication via a wireless network or communication network.

The controller 24 may further be in communication with a vehicle control module 182 via a communication bus 184. In this way, the controller 24 may be configured to receive various signals or indications of vehicle status conditions including, but not limited to, a gear selection (e.g. park, drive, etc.), a vehicle speed, an engine status, a fuel level notification, and various other vehicle conditions. The controller 24 may further be in communication with a variety of vehicle sensors configured to communicate various conditions of systems or devices related to the operation of the vehicle 10.

In some embodiments, the controller 24 may be in communication with one or more of the audio transducer 40 (e.g., microphone), suspension sensor 44, the ambient light sensor 28, the door ajar or latch sensor 48, or various additional sensors that may be incorporated in the vehicle. In such configurations, the controller 24 may be operable to monitor the status of various systems and devices related to the operation of the vehicle 10 based on signals or indications communicated from one or more of the vehicle monitoring systems. In response to a notification from the vehicle monitoring systems, the controller 24 may identify a proximity detection 106 of trespass detection 134 as previously discussed in the method 80.

In various embodiments, the controller 24 may be configured to control one or more deterrent outputs or notifications by communicating instructions to a vehicle lighting controller 186. The vehicle lighting controller 186 may be configured to control one or more vehicle lights (e.g. the exterior vehicle lights 78*a*). In some embodiments, the vehicle lighting controller 186 may be configured to control a first set or number of the vehicle lights to illuminate in a direction or region of the vehicle 10 where a loitering person, pedestrian 36, or trespasser 62 is located. The location or region of the object or person detected by the system 12 may be identified based on sensor data captured by one or more of the sensors 20 as discussed herein. In this away, the controller 24 may identify a region of the local environment 14 where the person, animal, or object is identified and communicate with the lighting controller 186 to illuminate a corresponding region with the vehicle lights 78*a*. The controller 24 may activate the output of additional deterrent output notifications from output devices 78, which may include the horn 78*b*, the alarm 78*c*, etc.

The disclosure provides for a variety of systems and configurations that may be utilized to monitor the local environment 14 proximate to the vehicle 10 and communicate notifications identifying triggering events that may warrant follow up by a user or operator of the system 12. Though a variety of specific exemplary devices are described, the beneficial systems provided herein may be combined in a variety of ways to suit a particular application for a vehicle or various other systems. Accordingly, it is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A monitoring system for a vehicle comprising:

a plurality of surveillance sensors in connection with the vehicle and configured to capture sensor data proximate to the vehicle;

a position sensor configured to detect a location of the vehicle; and a controller in communication with the surveillance sensors and the position sensor, wherein the controller:

determines a surveillance mode for the vehicle based on the sensor data and a plurality of security factors associated with the location of the vehicle;

activates the surveillance mode in response to the security factors;

monitors the sensor data and filters a plurality of security events from a plurality of benign events, wherein the controller distinguishes a trespasser detection in the sensor data as a security event from a passerby detection in the sensor data as a benign event; and selectively outputs alerts in response to the security events and the benign events.

2. The monitoring system according to claim 1, wherein the controller distinguishes the security events from the benign events based on the surveillance mode.

3. The monitoring system according to claim 2, wherein security events are events attributed to the sensor data indicating security risks to the vehicle.

4. The monitoring system according to claim 1, wherein the surveillance mode defines a security level associated with the location, and the security level is elevated in response to the detection of at least one of the security events.

5. The monitoring system according to claim 1, wherein the trespasser detection is distinguished from the passerby detection based on a proximity to the vehicle and a time duration of an object identified in the sensor data.

6. The monitoring system according to claim 1, wherein the trespasser detection is distinguished from the passerby detection based on an identification of human activity within a cargo region of the vehicle in the sensor data.

7. The monitoring system according to claim 6, wherein the human activity within the cargo region of the vehicle is identified in response to the sensor data indicating human activity detected in image data within a masked region corresponding to the cargo region.

8. The monitoring system according to claim 6, wherein the human activity is identified by the controller based on a pose detection indicating one or more of the interconnected joints entering the cargo hold in the image data.

9. The monitoring system according to claim 1, wherein the at least one of the security events is distinguished from at least one of the benign events by filtering local noise associated with typical ambient conditions associated with the location from potential threat conditions associated with elevated or characteristic noise conditions.

10. The monitoring system according to claim 1, wherein at least one of the security events is distinguished from at least one of the benign events based on a detection of a suspension sensor of the vehicle detecting an increased load on the vehicle.

11. The monitoring system according to claim 1, wherein the security factors comprise a theft activity level identified in response to the location of the vehicle that varies based on a time of day.

12. The monitoring system according to claim 1, wherein the plurality of security factors comprises an isolation factor indicating a constancy of the traffic attributed to the location of the vehicle based on a time of day.

13. The monitoring system according to claim 1, further comprising:

a communication circuit configured to communicate with a remote database in communication with the controller, wherein the controller further:

accesses security data for the security factors corresponding to the location via the remote database.

14. The monitoring system according to claim 1, wherein at least one of the alerts is communicated to a remote user device; and in response to the at least one alert, a prompt is issued on the remote user device requesting feedback identifying a deterrent action.

15. The monitoring system according to claim 14, wherein the deterrent action comprises at least one of a light activation, a horn activation, an alarm activation, and a notification via a speaker.

16. A method for controlling a monitoring system for a vehicle, the method comprising:

identifying a location of the vehicle;

capturing sensor data proximate to the vehicle via a plurality of surveillance sensors in connection with the vehicle;

determining a surveillance mode for the vehicle based on the sensor data and a plurality of security factors associated with the location of the vehicle;

activating the surveillance mode in response to the security factors;

monitoring the sensor data and distinguishing a plurality of security events from a plurality of benign events in response to the sensor data, wherein at least one of the security events is distinguished from at least one of the benign events by filtering local noise associated with typical ambient conditions for the location of the vehicle from potential threat conditions associated with elevated or characteristic noise conditions; and selectively outputting a plurality of alerts in response to the security events and the benign events.

17. The method according to claim 16, further comprising:

in response to the at least one alert, issuing a prompt on a remote user device requesting feedback identifying a deterrent action.

18. The monitoring system according to claim 17, wherein the deterrent action comprises at least one of a light activation, a horn activation, an alarm activation, and a notification via a speaker.

19. A monitoring system for a vehicle comprising:

a plurality of surveillance sensors in connection with the vehicle and configured to capture sensor data proximate to the vehicle;

a position sensor configured to detect a location of the vehicle; and a controller in communication with the surveillance sensors and the position sensor, wherein the controller:

determines a surveillance mode for the vehicle based on the sensor data and a plurality of security factors associated with the location of the vehicle;

activates the surveillance mode in response to the security factors;

monitors the sensor data and distinguishes a security event comprising a trespasser detection from a benign event comprising a passerby detection, wherein the trespasser detection is distinguished from the passerby detection based on an identification of human activity within a cargo region of the vehicle in the sensor data; and selectively outputs a notification of the security event and the benign event based on the surveillance mode, wherein the notification issues a prompt on a remote user device requesting feedback identifying a deterrent action.

* * * * *